US009619425B2

United States Patent
Momeni et al.

(10) Patent No.: US 9,619,425 B2
(45) Date of Patent: Apr. 11, 2017

(54) CONTROL UNIT FOR CURRENT-CONTROLLED BUS WHEREIN SAMPLING A CURRENT FLOWING THROUGH BUS CONNECTION IN ORDER TO DETECT DIGITAL MESSAGE OF A CONNECTABLE SENSOR

(71) Applicant: Robert Bosch GmbH, Stuttgart (DE)

(72) Inventors: Massoud Momeni, Reutlingen (DE); Matthias Siemss, Gomaringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 196 days.

(21) Appl. No.: 14/429,902

(22) PCT Filed: Sep. 5, 2013

(86) PCT No.: PCT/EP2013/068337
§ 371 (c)(1),
(2) Date: Mar. 20, 2015

(87) PCT Pub. No.: WO2014/044539
PCT Pub. Date: Mar. 27, 2014

(65) Prior Publication Data
US 2015/0248370 A1 Sep. 3, 2015

(30) Foreign Application Priority Data

Sep. 20, 2012 (DE) .................. 10 2012 216 848

(51) Int. Cl.
*G01R 31/28* (2006.01)
*G06F 13/42* (2006.01)
(Continued)

(52) U.S. Cl.
CPC .......... *G06F 13/4221* (2013.01); *B60T 7/042* (2013.01); *G06F 1/266* (2013.01);
(Continued)

(58) Field of Classification Search
CPC .................................................. G01R 31/3161
(Continued)

(56) References Cited

U.S. PATENT DOCUMENTS

| 4,352,251 A | 10/1982 | Sloan | |
|---|---|---|---|
| 4,862,069 A * | 8/1989 | Albee | G01R 31/3161 324/522 |
| 7,188,263 B1 * | 3/2007 | Rubinstein | G06F 1/3209 713/300 |

FOREIGN PATENT DOCUMENTS

| DE | 102008041030 | 2/2010 |
|---|---|---|
| DE | 102008042641 | 4/2010 |

(Continued)

OTHER PUBLICATIONS

International Search Report for PCT/EP2013/068337, issued on Nov. 14, 2013.

*Primary Examiner* — Tammara Peyton
(74) *Attorney, Agent, or Firm* — Norton Rose Fulbright US LLP

(57) ABSTRACT

An electronic control unit includes a bus connection for a connection to a bus line of a current-controlled bus, an evaluation device for sampling the current flowing through the bus connection in order to detect a digital message from a sensor which is connectable to the bus line, and a current controller for generating a predefined current pulse through the bus connection in order to induce the sensor to assume a predefined synchronization state. The current controller is set up to control the current through the bus connection in such a way that it corresponds to an operating current through the sensor.

8 Claims, 2 Drawing Sheets

(51) Int. Cl.
  *B60T 7/04* (2006.01)
  *H04B 3/54* (2006.01)
  *H04L 12/40* (2006.01)
  *H04L 29/08* (2006.01)
  *G06F 1/26* (2006.01)
  *H04L 25/02* (2006.01)

(52) U.S. Cl.
  CPC ......... *H04B 3/54* (2013.01); *H04L 12/40006* (2013.01); *H04L 67/12* (2013.01); *H04L 25/0282* (2013.01); *H04L 2012/40273* (2013.01)

(58) Field of Classification Search
  USPC ........................................................ 710/104
  See application file for complete search history.

(56) References Cited

FOREIGN PATENT DOCUMENTS

| | | |
|---|---|---|
| DE | 102009001370 | 9/2010 |
| DE | 102010043661 | 5/2012 |
| WO | WO01/58090 | 8/2001 |

\* cited by examiner

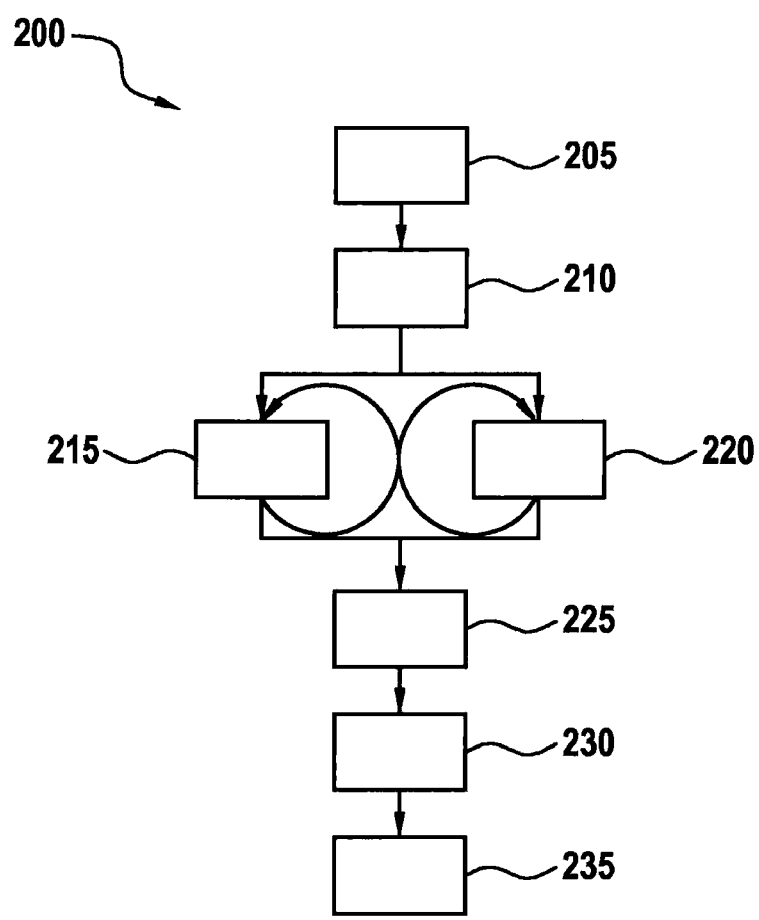

CONTROL UNIT FOR CURRENT-CONTROLLED BUS WHEREIN SAMPLING A CURRENT FLOWING THROUGH BUS CONNECTION IN ORDER TO DETECT DIGITAL MESSAGE OF A CONNECTABLE SENSOR

FIELD OF THE INVENTION

The present invention relates to an electronic control unit for a connection to a current-controlled bus. In particular, the present invention relates to a control unit and a method for checking the control unit.

BACKGROUND INFORMATION

A control system includes an electronic control unit and a number of sensors, which are interconnected by means of a current-controlled bus. The control system in particular can be installed on board of a motor vehicle, and the sensors can record parameters, which are forwarded to or processed by the control unit for the purpose of operating the motor vehicle. The control unit supplies a predefined quiescent current through a bus line of the current-controlled bus, and one of the sensors modifies this current in such a way that a digital transmission of data between the sensor and control unit is possible. Known current-controlled buses, for example, include PAS4 and PSI5.

For instance, a high current flow could correspond to a digital 1 and a low current flow to a digital 0. The control unit samples the current and converts it into a digital message of the sensor. At predefined time intervals, a synchronization pulse is generated on the bus. The control unit may include a separate current controller for this purpose, which supplies the synchronization current. The synchronization current may exceed an operating current of the current-controlled bus. If multiple sensors are connected to the bus, then a sensor for the data transmission may be selected by means of the synchronization pulse. In addition, a time synchronization of the sensors with the control unit is able to take place to facilitate the data transmission. Such an operation, which is able to operate without a separate timing circuit, is also referred to as an asynchronous operation.

Although only one of the sensors modulates the current flowing through the bus line at each instant, this current may also be affected by the other sensors, for example by their quiescent current withdrawal. In addition, the flowing current may vary on account of external influences, such as electromagnetic irradiation, thermal effects or voltage fluctuations of a voltage supply to which the control unit or one of the sensors is connected. To ensure correct functioning of the control unit or to calibrate the control unit, it is common practice to connect the control unit to a bus and one or more sensor(s) and to simulate different influences prior to the installation in the control system. The bus and the sensors may include real components or copies of real components.

The testing or calibration of the control unit at the described structure is involved and time-intensive. Especially when each control unit must be calibrated or tested individually, the manufacturing costs of the electronic control unit or the control system may be higher. It is an object of this invention to provide a simplified test structure and a test method for checking the control unit, which allow easier and less cost-intensive checking of the control unit. The present invention achieves this objective by a control unit and a method having the features of the respective independent claims. In addition, a computer program product is provided for achieving the objective.

SUMMARY

An electronic control unit according to the present invention includes a bus connection for connecting to a bus line of a current-controlled bus, an evaluation device for sampling the current flowing through the bus connection in order to detect a digital message from a sensor which is able to be connected to the bus line, and a current controller for generating a predefined current pulse through the bus connection in order to induce the sensor to assume a predefined synchronization state. The current controller is set up to control the current through the bus connection in such a way that it corresponds to an operating current through the sensor.

In this way the current controller for generating the synchronization pulse may be used for electrically simulating the bus and the sensor. This makes it possible to check the control unit without an external test structure, possibly even in the installed state (built-in self test, BIST). A conventional control unit may be used to realize this procedure, so that no additional internal circuits are required. An area on a silicon chip required for the control unit may remain unchanged.

The current controller is able to be used for adjusting different currents that may result when the bus is in operation. Checking or calibrating the control unit is able to be simplified in this way and be performed using less complex means. In addition, the checking or calibrating may be less time-consuming. This makes it possible to produce the electronic control unit with less complexity, and thus at reduced costs.

In one specific embodiment, the operating current is assigned to a acquiescent current through the sensor. In a further specific embodiment, the operating current is assigned to a transmitting current through the sensor. The acquiescent current and the transmitting current may represent two different binary values, which are used for transmitting information between the sensor and the control unit. The acquiescent current, for instance, may correspond to a binary 0 and the transmitting current to a binary 1, or vice versa. It is possible to check whether the evaluation device can recognize a current adjusted by the current controller as acquiescent current or as transmitting current. It is also possible to check whether a predefined time sequence of acquiescent current and transmitting current brought about by the current controller at the bus connection leads to the detection of a correct digital data telegram by the evaluation device.

The evaluation device may include a current source for supplying a current flowing through the bus connection, and the current controller may be set up to vary the supplied current in order to simulate the sensor.

The evaluation device usually includes a current source, which is not in operation while the current controller generates a synchronization pulse. By operating the current source and the current controller simultaneously, it is possible to conduct a realistic test which includes the evaluation device together with the current source. A test result of the evaluation device may therefore be more accurate or realistic.

In one specific embodiment, the current controller is set up to vary the current through the bus connection using a frequency that corresponds to a transmission rate of the sensor via the bus line. In other words, the current controller may be set up to influence the current through the bus connection more rapidly than this would be required for generating a synchronization pulse. By supplying a sufficiently rapid current controller, a data transmission from the sensor to the control device is able to be simulated at the full transmission speed. The checking of the control unit may thus take place under conditions that correspond to the conditions during the operation of the control unit. The current controller is preferably also configured to control sufficiently high currents in order to simulate the current effect of the sensor in a realistic manner.

In one specific embodiment, the current controller is controllable in an analog manner and the current controller includes a digital-to-analog converter. Because of the analog controllability of the current controller, a behavior of the sensor, which is connected to the bus connection via the bus line, can be simulated accurately. The digital-to-analog converter may make it possible for a digital processing device, which could be included in the control unit, to check the control unit.

In one preferred specific embodiment, the current controller includes a current source and a current sink. The current source can be provided to supply the synchronization pulse, and the current sink may be available for a sufficiently rapid termination of the synchronization pulse. The separate elements of the current controller may be used in a more optimal manner to simulate the operating current through the sensor.

A method according to the current invention for checking the described control unit includes the steps of controlling the current through the bus connection by means of the current controller in such a way that it corresponds to an operating current through a sensor which is able to be connected to the bus connection; of sampling the current flowing through the bus connection by means of the evaluation device; and of ascertaining whether the evaluation device has sampled the current correctly.

The method may simply be implementable on the control unit. In one specific embodiment, the control unit may include programmable functional blocks, which are configured in such a way within the scope of the method that the control unit corresponds to the afore-described control unit. For example, it may be possible to provide the control unit of the present invention in a simple manner on the basis of a known control unit.

A computer program product includes program code means for carrying out the described method when it is running on a programmable control unit or is stored on a computer-readable data carrier.

BRIEF DESCRIPTION OF THE DRAWINGS

FIG. 2 shows a flow chart of a method for checking the control unit of FIG. 1.

DETAILED DESCRIPTION

Figure 1:
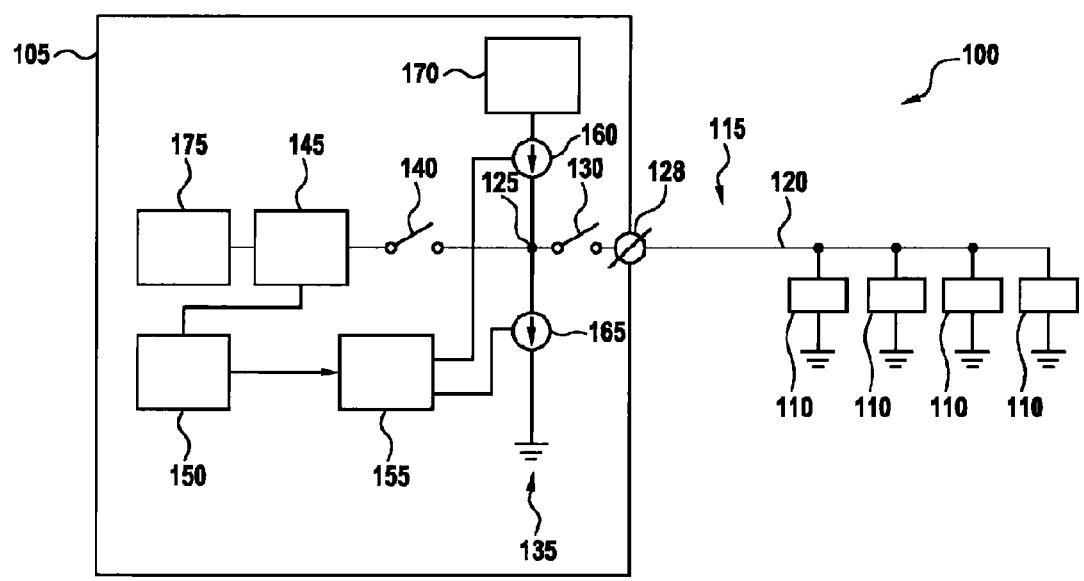
FIG. 1 shows an electronic control system.

FIG. 1 shows a control system 100 including an electronic control unit 105, preferably for use on board of a motor vehicle. In addition to control unit 105, control system 100 includes one or more sensor(s) 110 and a current-controlled bus 115, which connects sensors 110 to control unit 105. Current-controlled bus 115 includes a bus line 120 and a further line, which is indicated by corresponding ground symbols in FIG. 1. The system of sensors 110 is parallel by way of example. In another specific embodiment, however, sensors 110 may also be connected in series with bus 115. In one specific embodiment, the number of sensors 110 is restricted, such as to four sensors. However, it is always also possible to use fewer sensors 110. In another specific embodiment, more than four sensors 110 are an option.

Sensors 110 may be configured to record temperatures, switch positions or pressures, for example.

Control unit 105 includes a bus connection 125 for a connection to bus line 120, an optional switch 130, a current controller 135, a further switch 140, and an evaluation device 145. Switch 130 may be provided for electrically separating bus connection 125 from an external interface 128 of the control unit. If switch 130 is not provided, then bus connection 125 corresponds to interface 128. In addition, a processing unit 150 and a digital-to-analog converter 155 are provided in the specific embodiment illustrated. Current controller 135 is made up of a current source 160 and a current sink 165. For better comprehensibility, a first voltage supply 170 for current controller 135, and a second voltage supply 175 for evaluation device 145 are illustrated, as well.

During a normal communication operation, in which control unit 105 communicates with a sensor via bus 115, switch 130 is closed. In order to enable a communication of control unit 105 with a sensor 110, a predefined current pulse is first generated on bus 115 using current controller 135. Symbolic switch 140 indicates that evaluation device 145 is separated from current controller 135, i.e., is deactivated. In order to generate the synchronization pulse, first current source 160 is actuated in this particular specific embodiment in order to induce a predefined current at the bus connection or through bus line 120, while current sink 165 is deactivated. After the elapsing of a predefined time, which corresponds to the length of the synchronization pulse, current source 160 is deactivated and current sink 165 is activated in order to induce a predefined decay of the current flowing through bus connection 125 or through bus line 120. Subsequently, both current source 160 and current sink 165 are deactivated.

Switch 140 is closed, and evaluation device 145 is taken into operation. Evaluation device 145 usually has its own current source, which induces a predefined current in the range of, for example, 4 to 65 mA through bus connection 165 or bus line 120.

The synchronization pulse transfers sensors 110 into a predefined state. During a time period until the following synchronization pulse, such as 500 ms, for instance, sensors 110 have the opportunity to transmit data to control unit 105. A transmission sequence of sensors 110 is predefined in this context. If one of sensors 110 determines that a time window that is predefined for it between the synchronization pulses has been reached, it varies the current flowing through bus line 120 by changing its internal resistance. To do so, sensor 110 may include its own device for controlling the current, such as a constant current source or sink.

Sensor 110 is usually set up not to influence the current through bus line 120, or to change it to a predefined value. In another specific embodiment, sensor 110 may also be designed to adjust the current to two different values. In both cases two different current values result, which are usually assigned to two different binary symbols, e.g., 0 and 1. A time sequence of the current flowing through bus lines 120 thus corresponds to a pulse telegram or a data telegram encoded in current, which represents a digital message. Evaluation device 145 samples the current or its time characteristic and is able to receive the data telegram in this manner.

The quiescent current and the transmitting current, which are represented by the two binary symbols, may possibly be variable in their absolute values and, for example, may be defined with regard to an operating voltage of control unit 105 and sensor 110. In order to test whether evaluation device 145 is able to receive a data telegram under different conditions, i.e., at different absolute values for the quiescent current and the transmitting current, it is generally necessary to construct or model bus 115 and at least one sensor 110 and to connect it to bus connection 125. In contrast thereto, it is proposed to determine the behavior of evaluation device 145 vis-à-vis different currents through bus connection 145 using on-board means of control unit 105.

If bus 115 is connected to control unit 105, it may be advantageous to separate it from bus connection 125 with the aid of switch 130. Switch 140 is closed, and evaluation device 145 is taken into operation. This also connects the current source within evaluation device 145 to bus connection 125. Then, current controller 135 is actuated to vary the current flowing through bus connection 125 in such a way that the quiescent current, the transmitting current or the time sequence between quiescent and transmitting current behaves in the way of a sensor 110 or a multiplicity of sensors 110 connected to control unit 105 by means of bus 115. Both a static condition and an absolute quiescent or transmitting current as well as a dynamic condition, such as a predefined pulse telegram that is encoded in a sequence of quiescent and transmitting current may be generated in the process.

In the present specific embodiment, current source 160 and current sink 165 are each controllable in an analog manner by a voltage. Using a digital-to-analog converter 155, corresponding control voltages are provided, which actuate current source 160 and current sink 165 in an appropriate manner. Usually, current source 160 or current sink 165 is active exclusively in order to avoid an unnecessary current flow between first voltage supply 170 and ground.

Digital-to-analog converter 155 is controllable by processing device 150. In the specific embodiment shown, processing device 150 is also connected to evaluation device 145 in order to be able to check how a test condition generated by means of current controller 135 has been evaluated by evaluation device 145.

FIG. 2 shows a flow chart of a method for checking control unit 105 of FIG. 1. In an optional first step 205, bus 115, provided it is connected to interface 128, is electrically separated from bus connection 125. Switch 130 may be used for this purpose. In addition, switch 140 is closed, and evaluation device 145 is taken into operation. Current controller 135 may optionally be used to trigger a synchronization pulse if such a pulse is analyzed by evaluation device 145.

In a step 210, current controller 135 is then actuated in order to influence the current flowing through bus connection 125, which is controlled or restricted by an internal current source of evaluation device 145. In a step 215, a quiescent current, and in a step 220, a transmitting current through bus connection 125 may be induced. Steps 215 and 220 may be executed in any sequence and also multiple times one after the other.

In a step 225, which preferably is executed in parallel with steps 215 and 220, the current through bus connection 125 is sampled with the aid of evaluation device 145. In a step 230, the sampled current or a sequence of sampled currents is compared to a predefined current or a sequence of predefined currents, which was/were induced by current controller 135. This step is preferably carried out by means of processing device 150.

In a subsequent step 235, it is also ascertained whether the currents that were compared are in agreement. If this is the case, control unit 105 is diagnosed as error-free. Otherwise, control unit 105 may be evaluated as defective. In a variant, it is also possible to ascertain function limits of control unit 105 instead of the operativeness of control unit 105, in that the detectability of predefined absolute currents through bus connection 125 is ascertained with the aid of evaluation device 145. In a still further specific embodiment, control unit 105 may also be calibrated by adapting parameters of evaluation device 145, such as a detection threshold for a particular current or a current flowing through the internal current source, as a function of a comparison result.

What is claimed is:

1. An electronic control unit, comprising:
   a bus connection for a connection to a bus line of a current-controlled bus;
   an evaluation device for sampling a current flowing through the bus connection in order to detect a digital message of a sensor which is connectable to the bus line;
   a current controller for generating a predefined current pulse through the bus connection in order to induce a predefined synchronization state of the sensor, wherein:
   the current controller controls the current through the bus connection in such a way that the current corresponds to an operating current through the sensor,
   the evaluation device includes a current source for supplying the current flowing through the bus connection, and
   the current controller varies the supplied current in order to simulate the sensor.

2. The control unit as recited in claim 1, wherein the operating current is assigned to a quiescent current through the sensor.

3. The control unit as recited in claim 1, wherein the operating current is assigned to a transmitting current through the sensor.

4. The control unit as recited in claim 1, wherein the operating current has a predefined time characteristic.

5. The control unit as recited in claim 1, wherein the current controller varies the current through the bus connection using a frequency that corresponds to a transmission rate of the sensor via the bus line.

6. The control unit as recited in claim 1, wherein the current controller is able to be controlled in an analog manner, and wherein the current controller includes a digital-to-analog converter.

7. The control unit as recited in claim 1, wherein the current controller includes a current source and a current sink.

8. A method for checking a control unit that includes a bus connection for a connection to a bus line of a current-controlled bus, an evaluation device for sampling a current flowing through the bus connection in order to detect a digital message of a sensor which is connectable to the bus line, a current controller for generating a predefined current pulse through the bus connection in order to induce a predefined synchronization state of the sensor, wherein the evaluation device includes a current source for supplying the current flowing through the bus connection, the method comprising:

controlling the current through the bus connection by using the current controller in such a way that the current corresponds to an operating current through a sensor which is able to be connected to the bus connection;

varying the current in such a way in order to simulate the sensor;

sampling the current flowing through the bus connection with the aid of the evaluation device; and ascertaining whether the evaluation device has sampled the current correctly.

* * * * *